June 19, 1956

D. F. THOMAS ET AL 2,750,894

CENTRIFUGAL PUMP

Filed March 16, 1951

INVENTOR

David F. Thomas
George A. Rathburn

BY Robert M. Dunning
ATTORNEY

United States Patent Office 2,750,894
Patented June 19, 1956

2,750,894
CENTRIFUGAL PUMP

David F. Thomas, Minneapolis, and George A. Rathburn, St. Paul, Minn., assignors to Waterous Company, St. Paul, Minn., a corporation of Minnesota Application March 16, 1951, Serial No. 215,888

6 Claims. (Cl. 103—108)

This invention relates to an improvement in centrifugal pump and deals particularly with a means of lubricating the pump packing.

A centrifugal pump is not a self-priming type of pump and as a result may operate at times while not pumping water or other liquid. Pumps of this type are commonly provided with packing seals which may be lubricated by the water or other liquid being pumped. However, when such a pump is run dry the seals have a tendency to wear. It is the purpose of the present invention to provide a means of obviating this difficulty.

An object of the present invention lies in the provision of a lubricating structure including a pressure cup or similar object containing lubricant under compression and connecting this lubricating structure to the pump in such a way that the lubricant will be forced into the pump when the same is running dry. The lubricant system is so connected that when water is present to lubricate the pump packing the lubricant system will be automatically cut out.

A feature of the present invention lies in connecting a source of supply of lubricant under pressure to the packing so that when the pump is running dry, lubricant will be slowly forced into the packing. On the other hand, when water under pressure reaches the point in the packing to which the lubricant system is connected, a check valve will be closed which serves to cut off the source of supply of lubricant until this pressure again drops below the pressure of the lubricant.

An added feature of the present invention resides in the provision of a system for forcing water under pressure into the packing to lubricate the same when water is being pumped. This same system is connected to a source of lubricant under pressure which serves to lubricate the packing when the pump is running dry.

These and other objects and novel features of the present invention will be more clearly and fully set forth in the following specification and claims.

In the drawings forming a part of the specification:

Figures 1, 2:
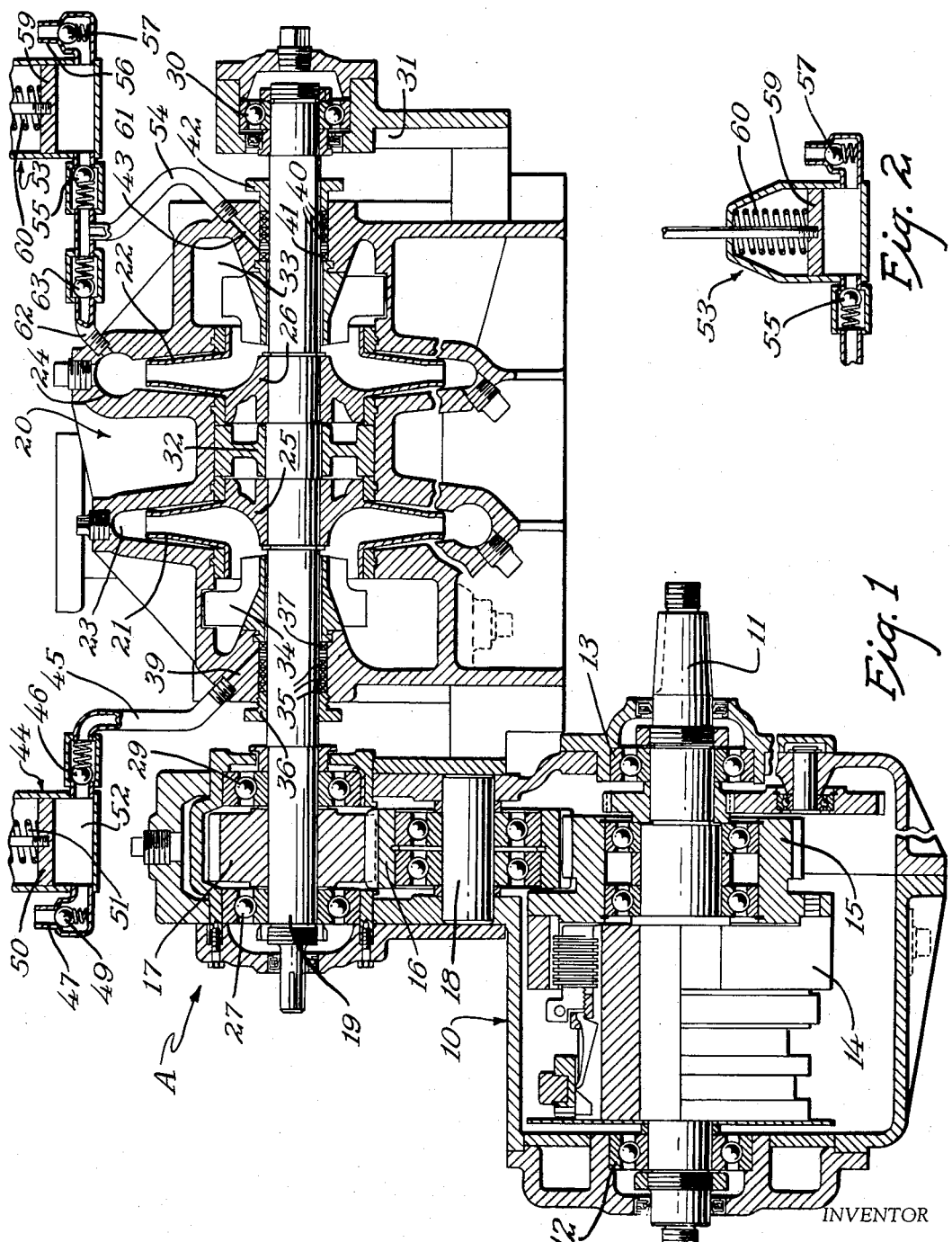
Figure 1 is a sectional view through a centrifugal pump showing the manner in which the lubrication system may be connected thereto.
Figure 2 is a sectional view through a type of pressure lubricator which may be employed.

The pump A may be of any suitable type, the one illustrated being a two stage pump in which the two stages are connected in series. The pump is shown as including a drive mechanism which will not be disclosed in detail, as the particular nature of the drive is of no importance in the present invention. The pump A is shown as including a gear box 10 having a drive shaft 11 projecting therefrom for connection with a suitable source of power supply. The drive shaft 11 is supported by suitable bearings 12 and 13 and is connected to a clutch mechanism indicated generally by the numeral 14. Through this clutch mechanism the drive shaft 11 may act to drive a main drive gear 15 which acts through an idle gear 16 to rotate a driven gear 17 mounted upon an impeller shaft 18. All of the gears mentioned as well as the drive shaft 11, the clutch 14, the idler shaft 19 and the clutch actuating mechanism, is located in some part of the gear box 10.

The impeller shaft 19 extends into the pump housing 20. A pair of impellers 21 and 22 is supported upon the shaft 19 within the housing 20. Volutes 23 and 24 are provided encircling the impellers 21 and 22 to receive the fluid forced into the same by the impellers. The impellers 21 and 22 are provided with hubs 25 and 26 which are keyed or otherwise secured to the shaft 19 to rotate in unison therewith. The gear box 10 includes a pair of spaced bearings 27 and 29 which act to support one end of the impeller shaft 19. The gear box is directly connected to the pump housing 20 to properly support the shaft in fixed relation to the pump housing. The opposite end of the impeller shaft 19 is supported by an outboard bearing 30 which is supported by a suitable bracket 31 secured to the pump housing. Thus the bearings 27 and 29 and 30 may be properly lubricated as they are external of the pump housing. A wear ring 32 encircles the shaft 19 between the impeller hubs 25 and 26 to separate the impeller chambers from one another.

In the particular type of pump illustrated the impeller 22 forms the first stage of the pump while the impeller 21 forms the second stage thereof. As a result the intake chamber 33 adjoining the impeller 22 is normally under partial vacuum during operation of the pump. The inlet chamber 34 adjoining the impeller 21 and forming an intake therefor is connected to the discharge end of the volute 24 encircling the impeller 22 and so is under pressure when the pump is in operation.

A series of packing rings 35 encircle the impeller shaft 19 at a point adjacent to the intake chamber 34 of the second stage impeller 21. A packing nut axially movable packing member 36 holds the packing rings 35 in place. One packing ring 37 comprises the innermost packing ring of the series and is preferably spaced inwardly from the other packing rings. A passage 39 through the pump housing communicates with the space between the innermost packing ring 37 and the remaining packing rings for a purpose which will be later described.

A series of packing rings 40 encircle the impeller shaft 19 adjacent the inlet chamber 33 of the impeller 22. The innermost ring 41 of the series is preferably spaced from the remaining packing rings. The rings are held in place by a packing nut or axially movable packing member 42 which holds the various packing rings in place. A passage 43 leads from the space between the innermost packing ring 41 and the remaining packing rings 40 for a purpose which will be later described in detail.

A pressure cup 44 is supported near the pump housing and is connected thereto by a tubular connection 45 which communicates with the passage 39 in the pump housing. A check valve 46 is provided between the pressure cup 44 and the tubular connection 45 which permits lubricant to move through the tubular passage 45 in a direction toward the pump housing, but which prevents a reverse flow from the pump toward the pressure cup. The pressure cup 44 is shown as including a fitting 47 by means of which the cup may be filled and which is normally closed by a check valve 49. A piston or plunger 50 is provided within the pressure cup 44 and which is urged downwardly by a spring 51. As a result the lubricant within the pressure chamber 52 near the lower end of the pressure cup is at all times under compression. The pressure of the lubricant is insufficient to disturb the various packing rings 35 and 37 but is sufficient to slowly feed lubricate to the space between the packing rings 35 and 37 when the pump is running dry. In other words, the packing rings will at all times be lubricated by lubricant from the pressure cup 44 when the pump is running dry.

A similar pressure cup 53 is connected by a suitable tubular conduit 54 to the passage 43 leading to the space between the packing rings 40 and 41. A check valve 55 is provided adjacent to the pressure cup 53 which permits a flow of lubricant from the pressure cup toward the pump housing, but which prevents a reverse flow through the passageway toward the pressure cup. The pressure cup 53 is shown as including a fitting 56 by means of which the pressure cup may be filled. The fitting 56 is normally closed by a check valve 57. A piston or plunger 59 is provided within the pressure cup 53 which is normally urged downwardly by a spring 60. Thus the lubricant within the chamber 61 is normally under pressure while contained in the pressure cup. As a result when the pump is running dry, the lubricant from the pressure cup may flow past the check valve 55 through the connection 54 and the passage 43 to lubricate the packing rings 40 and 41.

In order that these packing rings 40 and 41 may be lubricated by the liquid being pumped during the time the pump is in operation, a by-pass connection 62 is provided leading from the volute 24 or discharge end of the first stage impeller 22 to the tubular connection 54. The by-pass passage 62 includes a check valve 63 which is normally closed when the first stage impeller is not pumping water and which may open when pressure exists in the first stage discharge volute 24. Thus the packing may be lubricated either by lubricant or by the liquid being pumped.

The operation of the system may be simply understood from the foregoing explanation. When the pump is running dry, the lubricant from the pressure cup 44 acts to lubricate the packing rings 35, 37 at one end of the pump housing and lubricant from the pressure cup 53 acts to lubricate the packing rings 40, 41 at the opposite end of the pump housing. During this operation the check valves 46 and 55 open to permit a slow flow of lubricant toward the pump housing. The lubricant employed may vary from an oil to a semi-solid grease, the latter being desirable for the purpose of economy.

When the liquid reaches the intake chamber 33 of the first stage impeller 22 and is drawn into the first stage impeller, partial vacuum still exists in the area of the packing rings 40, 41. In order to lubricate these packing rings with the liquid being pumped, a small amount of liquid may by-pass through the connection 62 opening the check valve 63 and closing the check valve 55. This liquid under pressure may thus lubricate the packing rings 40 and 41 as long as the pump is in pumping operation. In the event the pump should lose its prime and the pressure in the volute 24 should drop, the check valve 63 will again close. The check valve 55 will again open and lubricant will again flow from the pressure cup 53 into the packing rings at the right hand end of the pump as viewed in Figure 1.

Fluid under pressure flows from the volute 24 to the intake chamber 34 of the second stage impeller 21. As the liquid in the intake chamber 34 is always under pressure when the pump is in pumping operation, a certain amount of liquid will leak past the packing ring 37 to the space between the packing ring 37 and the packing rings 35. When liquid pressure builds up at this point the lubricant is held from passing toward the pump housing from the pressure cup 44 and the check valve 46 will close. As a result the packing rings 35, 37 will be normally lubricated by the liquid being pumped as long as the pump is in pumping operation. When the pressure in the inlet chamber 34 drops the lubricant may again flow toward the pump from the pressure cup 44.

In accordance with the patent statutes, the principles of construction and operation of the centrifugal pump have been described and while it has been endeavored to set forth the best embodiment thereof, it is desire to have it understood that obvious changes may be made within the scope of the following claims without departing from the spirit of the invention.

We claim:

1. A centrifugal pump including a pump housing, a shaft supported in said housing, a pair of impellers upon said shaft within said housing, one of said impellers comprising a first stage impeller and the other impeller comprising a second stage impeller, intake chambers within said housing adjacent to said impellers and subject to variable pressures developed by said impellers, packing encircling said shaft between said shaft and said housing, and a source of lubricant under pressure connected to said housing and communicating with a point between the ends of said packing to lubricate the same, the portion of the packing between said point between the ends of said packing and the second stage impeller intake chamber being sufficiently free in fit to permit some leakage of fluid from the second stage impeller intake chamber to said point between the ends of said packing when said second stage impeller intake chamber is subjected to elevated pressure, whereby said point between the ends of said packing is also subject to said elevated pressure, and a check valve between said source of lubricant and said packing to permit a flow of lubricant toward said housing when the fluid pressure is too low to lubricate adequately the pump packing and to prevent a reverse flow of fluid under pressure toward said lubricant source.

2. A centrifugal pump including a pump housing, a shaft supported in said housing, a pair of impellers supported upon said shaft within said housing, an intake chamber adjacent each impeller, one of said impellers comprising a first stage impeller and the other of said impellers comprising a second stage impeller, an annular packing chamber within said pump housing encircling said shaft adjacent the intake chamber of the first stage impeller, a similar annular packing chamber within said pump housing encircling said shaft adjacent the intake chamber of said second stage impeller, packing in said packing chambers a passage communicating with said packing chamber at a point intermediate the ends thereof, the portion of the packing between said intermediate point and the second stage intake chamber permitting some leakage of fluid from the second stage impeller chamber to said intermediate point when said second stage impeller is subjected to elevated pressure, whereby said intermediate point is also subject to said elevated pressure, a source of lubricant under pressure connected with said passage, and a check valve in said passage preventing a reverse flow of lubricant toward said lubricant source.

3. A centrifugal pump including a pump housing, a shaft supported in said housing, a pair of impellers supported on said shaft within said housing, an intake chamber adjacent each impeller, one of said impellers being a first stage impeller and the other of said impellers comprising a second stage impeller, an annular packing chamber within said pump housing encircling said shaft adjacent to the intake chamber of the first stage impeller, packing in said packing chamber, a passage communicating with said packing chamber at a point intermediate the ends therein subject to substantially intake chamber pressure of the first stage impeller, a source of lubricant under pressure connected to said passage, a check valve in said passage preventing a reverse flow of lubricant into said lubricant source, and a pressure connection from the pressure side of one of said impellers to said passage between said check valve and said packing chamber to permit the flow of fluid under pressure to said packing chamber.

4. A centrifugal pump including a pump housing, a shaft supported in said housing, a pair of impellers supported on said shaft within said housing, an intake chamber adjacent each impeller, one of said impellers being a first stage impeller and the other of said impellers comprising a second stage impeller, an annular packing chamber within said pump housing encircling said shaft adjacent to the intake chamber of the first stage impeller, packing in said packing chamber, a passage communicating with said packing chamber at a point intermediate the ends therein subject to substantially intake chamber pressure of the first stage impeller, a source of lubricant under pressure connected to said passage, a check valve in said passage preventing a reverse flow of lubricant into said lubricant source, said pump housing including volutes encircling said impellers, and a by-pass connecting one of said volutes to said passage between said check valve and said packing chamber through which liquid under pressure may flow from said one volute to said packing chamber.

5. A centrifugal pump including a pump housing, a shaft supported in said housing, a pair of impellers supported on said shaft within said housing, an intake chamber adjacent each impeller, one of said impellers being a first stage impeller and the other of said impellers comprising a second stage impeller, an annular packing chamber within said pump housing encircling said shaft adjacent to the intake chamber of the first stage impeller, packing in said packing chamber, a passage communicating with said packing chamber at a point intermediate the ends therein subject to substantially intake chamber pressure of the first stage impeller, a source of lubricant under pressure connected to said passage, a check valve in said passage preventing a reverse flow of lubricant into said lubricant source, said pump housing including volutes outwardly of said impellers, and a by-pass connecting one of said volutes to said passage between said check valve and said packing chamber, and a check valve in said by-pass permitting fluid under pressure to flow from said one volute toward said passage.

6. A centrifugal pump including a pump housing, a shaft supported in said housing, a pair of impellers supported on said shaft within said housing, an intake chamber adjacent each impeller, one of said impellers being a first stage impeller and the other of said impellers comprising a second stage impeller, an annular packing chamber within said pump housing encircling said shaft adjacent to the intake chamber of the first stage impeller, packing in said packing chamber, a passage communicating with said packing chamber at a point intermediate the ends therein subject to substantially intake chamber pressure of the first stage impeller, a source of lubricant under pressure connected to said passage, a check valve in said passage preventing a reverse flow of lubricant into said lubricant source, said pump housing including volutes outwardly of said impellers, a by-pass connecting the volute of the first stage impeller to a point in said passage between said check valve and said packing chamber, said by-pass including a check valve designed to permit the flow of fluid under pressure from said last named volute toward said passage and to prevent a reverse flow.

References Cited in the file of this patent
UNITED STATES PATENTS

| | | |
|---|---|---|
| 1,086,063 | Lobnitz | Feb. 3, 1914 |
| 1,305,005 | Pihlfeldt et al. | May 27, 1919 |
| 1,382,490 | Ericson | June 21, 1921 |
| 1,721,737 | Joyce | July 23, 1929 |
| 1,806,770 | Van Weenen | May 26, 1931 |
| 1,909,560 | Wintroath | May 16, 1933 |
| 1,924,407 | La Bour | Aug. 29, 1933 |
| 2,193,826 | Mann | Mar. 19, 1940 |
| 2,207,208 | Thrush | July 9, 1940 |
| 2,244,450 | Erni | June 3, 1941 |
| 2,257,011 | Hillier | Sept. 23, 1941 |
| 2,331,641 | Walker | Oct. 12, 1943 |
| 2,332,150 | Huff | Oct. 19, 1943 |
| 2,505,868 | Murphy | May 2, 1950 |
| 2,632,395 | Jennings et al. | Mar. 24, 1953 |